United States Patent [19]

Gifford

[11] Patent Number: 5,201,971
[45] Date of Patent: Apr. 13, 1993

[54] PNEUMATIC TIRES CONTAINING A COMPOSITE BELT

[75] Inventor: James H. Gifford, Orange, Conn.
[73] Assignee: Pirelli Armstrong Tire Corporation, New Haven, Conn.
[21] Appl. No.: 918,894
[22] Filed: Jul. 20, 1992

Related U.S. Application Data

[63] Continuation of Ser. No. 340,253, Apr. 19, 1989.
[51] Int. Cl.$^5$ .......................... B60C 9/00; B60C 9/18; B32B 3/12
[52] U.S. Cl. ................................. 152/536; 152/526; 152/537; 428/109; 428/118
[58] Field of Search ............................... 152/196–197, 152/526–527, 532, 536–538; 428/109, 118

[56] References Cited

U.S. PATENT DOCUMENTS

| | | |
|---|---|---|
| 1,220,914 | 3/1917 | Wapshare ............................ 152/197 |
| 2,713,884 | 7/1955 | Schwartz ......................... 152/452 X |
| 3,034,557 | 5/1962 | Beckadolph . |
| 3,380,878 | 4/1968 | Wheeler, III .................... 428/286 X |
| 3,380,880 | 4/1968 | Wheeler, III ........................ 428/286 |
| 3,392,774 | 7/1968 | Le Bosse ............................ 152/538 |
| 3,523,472 | 8/1970 | Marzocchi et al. . |
| 3,637,003 | 1/1972 | Clapson . |
| 3,641,230 | 2/1972 | Jenks ................................. 264/316 |
| 3,684,616 | 8/1972 | Wright et al. ..................... 156/307.5 |
| 3,692,080 | 9/1972 | Bolleau . |
| 3,757,843 | 9/1973 | Carr ................................... 152/527 |
| 3,842,885 | 10/1974 | Alban ................................ 152/532 |
| 3,902,732 | 9/1975 | Fosha, Jr. et al. .................. 156/172 |
| 3,987,684 | 10/1976 | Fisher et al. ........................ 156/142 |
| 4,051,289 | 9/1977 | Adamson ............................ 156/227 |
| 4,058,152 | 11/1977 | Beck et al. ......................... 152/310 |
| 4,111,249 | 9/1978 | Markow .............................. 152/536 |
| 4,169,494 | 10/1979 | Kubica et al. ................ 152/333.1 X |
| 4,318,434 | 3/1982 | Markow . |
| 4,428,411 | 1/1984 | Markow et al. . |
| 4,442,879 | 4/1984 | Uemura .......................... 152/526 X |
| 4,456,048 | 6/1984 | Markow et al. ................ 152/520 X |
| 4,543,289 | 9/1985 | Park ............................. 428/319.7 X |
| 4,647,613 | 3/1987 | Jadamus et al. . |
| 4,656,220 | 4/1987 | Jadamus et al. . |
| 4,673,014 | 6/1987 | Markow . |
| 4,690,970 | 9/1987 | Feinauer et al. . |
| 4,690,978 | 9/1987 | Jadamus et al. . |
| 4,728,693 | 3/1988 | Droescher et al. . |
| 4,734,144 | 3/1988 | Markow .............................. 156/123 |
| 4,746,482 | 5/1988 | Ribbing et al. . |
| 4,760,115 | 7/1988 | Droescher et al. . |
| 4,778,849 | 10/1988 | Bartmann et al. . |
| 4,800,120 | 1/1989 | Jadamus et al. ................. 428/295 X |
| 4,809,758 | 3/1989 | Janus ............................. 152/536 X |
| 4,816,345 | 3/1989 | Jadamus et al. . |
| 4,835,063 | 5/1989 | Jadamus et al. . |
| 4,902,365 | 2/1990 | Westlake, Sr. .................. 428/118 X |
| 4,906,508 | 3/1990 | Blankenberg et al. ......... 428/118 X |

FOREIGN PATENT DOCUMENTS

| | | |
|---|---|---|
| 0093451 | 11/1983 | European Pat. Off. . |
| 0173670 | 3/1986 | European Pat. Off. ............ 152/526 |
| 0200055 | 11/1986 | European Pat. Off. ............ 152/531 |
| 1290231 | 3/1962 | France .............................. 152/532 |
| 61-77503 | 4/1986 | Japan ................................ 152/537 |
| 63-162304 | 7/1988 | Japan ................................ 152/526 |

OTHER PUBLICATIONS

*Modern Plastics Encyclopedia*, ed. Sidney Gross, vol. 51, No. 10A, Oct. 1974, McGraw-Hill Publications, p. 58.
*Honeycomb Sandwich Design*, Hexcel Products Inc.: Hexcel Products Inc., Berkeley, CA, 1959, pp. 16–19.
*Mechanics of Pneumatic Tires*, ed. Samuel Clark: US Dept. of Transportation, Aug. 1981, pp. 216–225.
*Mechanics of Pneumatic Tires*, ed. Samuel Clark: US Dept. of Transportation, Aug. 1981, p. 140, Figure 3.12a.

Primary Examiner—Michael W. Ball
Assistant Examiner—Adrienne C. Johnstone
Attorney, Agent, or Firm—St. Onge Steward Johnston & Reens

[57] ABSTRACT

An improved reinforcing belt is provided for a pneumatic tire. In one embodiment, a composite belt is formed by bonding together a plurality of resin impregnated plies. Each ply is further formed from cords having a high extensional modulus of elasticity and a high tenacity which reinforce a matrix of semi-rigid resin. Preferably, the resin is cured or formed in situ during the curing of the tire in which the plies are placed. In another embodiment, a structural separator having a high resistance to compression is bonded to and between at least two of the plies.

4 Claims, 3 Drawing Sheets

PNEUMATIC TIRES CONTAINING A COMPOSITE BELT

This is a continuation of copending application Ser. No. 07/340,253 filed on Apr. 19, 1989.

FIELD OF THE INVENTION

This invention relates to pneumatic tires, and more specifically to reinforcing belts for pneumatic tires.

BACKGROUND ART

Belts for use in reinforcing pneumatic tires are well known in the art. For example, U.S. Pat. Nos. 3,523,472 and 3,842,885 disclose reinforcing belt constructions designed to prolong tread life. Similarly, U.S. Pat. No. 3,392,774 discloses a reinforcing belt construction designed to improve the cornering capabilities of a tire. The reinforcing belts in these and similar patents are typically formed from cords, sheets, filaments or the like which reinforce a rubber or polymeric matrix.

More recently, reinforcing belts having particular constructions have been tried in an effort to improve fuel efficiency, handling and run-flat capability. European Patent 0 093 451 discloses the use of a circumferentially inextensible breaker band having a single cord layer reinforcing thermoplastic elastomeric materials to reduce the amount of horsepower absorbed by the tire. Further, U.S. Pat. Nos. 4,111,249 and 4,318,434 disclose the incorporation into a tire of a solid annular band of filament reinforced epoxy resin, high strength metal, or the like, to improve the run-flat capability of the tire. One problem with these belt constructions is that because the belt is preformed or precured and inserted into the tire, the uniformity and homogeneity of the tire may be compromised.

SUMMARY OF THE INVENTION

It is an object of this invention to provide a lightweight and semi-rigid reinforcing belt for improved performance in a pneumatic tire. It is a further object of this invention to provide a reinforcing belt having a high resistance to compression. Yet another object of this invention is to provide a reinforcing belt cured or formed in situ during the curing of the tire within which it is placed.

These and other objects are obtained in the present invention by the provision of an improved reinforcing belt for a pneumatic tire. In one embodiment, a composite belt is formed by bonding together a plurality of resin impregnated plies. Each ply is further formed from cords having a high extensional modulus of elasticity and a high tenacity which reinforce a matrix of semi-rigid resin. Preferably the resin is cured or formed in situ during the curing of the tire in which the plies are placed. Further, the plies are preferably bonded in situ as well. This provides the finished tire with a homogeneity and uniformity unobtainable in prior art constructions. The cords are preferably selected from the group consisting of steel, fiberglass, carbon, polyesters and most preferably aramid. The resin is preferably chosen from the group consisting of epoxies, polyesters, nylons, and most preferably polyphenylene ethers.

In another embodiment, a structural separator having a high resistance to compression is bonded to and between at least two of the plies. This provides the finished composite belt with increased rigidity without appreciably increasing its mass. Preferably, there are at least four plies and the separator preferably has an equal number of plies on each side. Further, the separator is preferably selected from the group consisting of rigid foams, corrugations and most preferably honeycombs.

The invention and its particular features will become more apparent from the following detailed description when considered with reference to the accompanying drawings.

DETAILED DESCRIPTION

Figure 1:
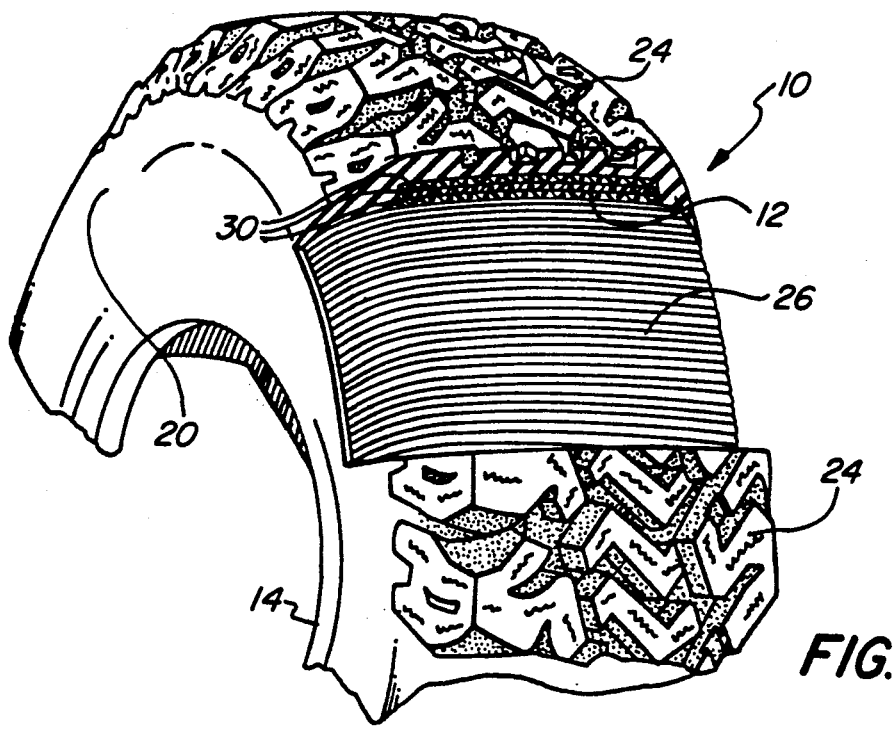
FIG. 1 is a front perspective view of a tire partially cutaway to show a composite reinforcing belt, in accordance with this invention, fixed therein.
Figure 2:
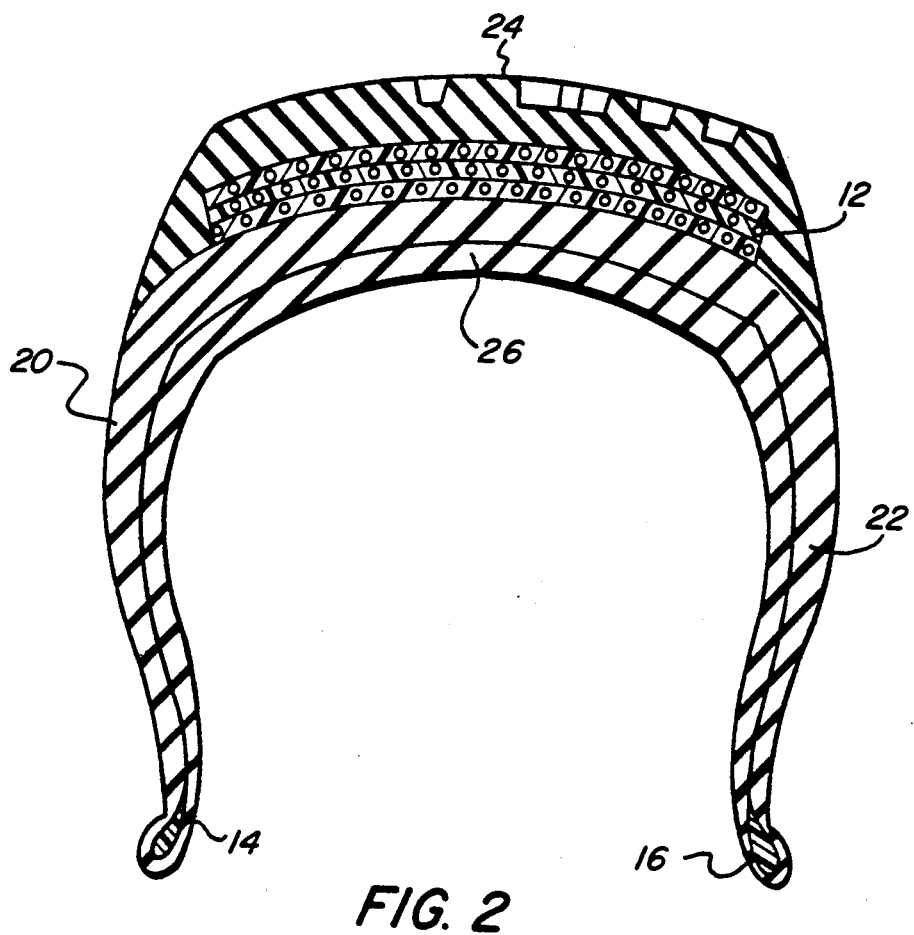
FIG. 2 is a front cross-sectional view of the tire in FIG. 1.

Referring to FIGS. 1 and 2, a pneumatic tire 10 having a composite reinforcing belt 12 in accordance with this invention is generally shown. Tire 10 includes bead portions 14 and 16, side walls 20 and 22, and a tread portion 24. Composite belt 12 lies beneath (i.e., radially inward of) tread portion 24 and above carcass 26 as shown both in FIG. 2 and the partial cutaway of FIG. 1. Further, composite belt 12 is formed from a plurality of resin impregnated or prepreg plies 30, the resin binding the plies together to form a single monolithic structure. A more detailed description of the composite belt 12 follows, with reference to FIG. 4.

Figure 3:
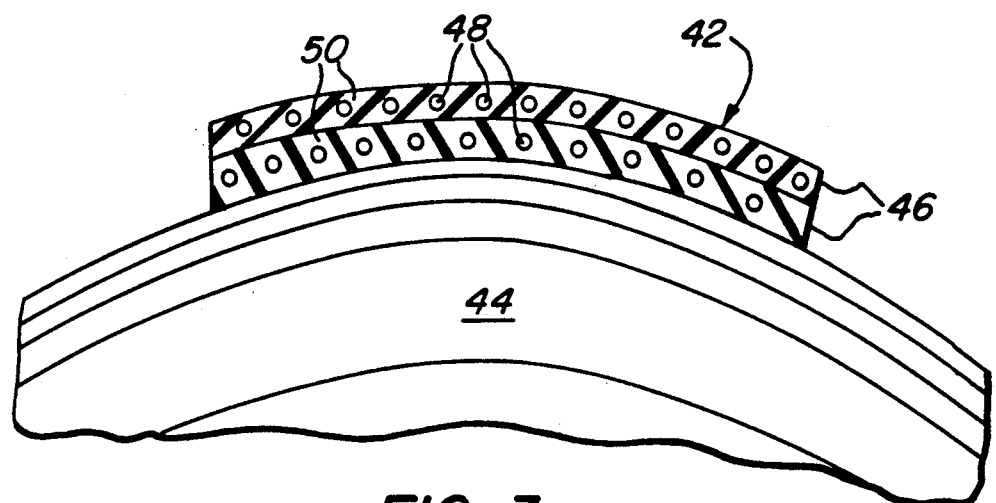
FIG. 3 is a schematic front cross-sectional view of a typical prior art reinforcing belt construction.

Referring now to FIG. 3, a schematic cross-sectional view of a prior art tire construction, a prior art reinforcing belt 42 is shown. Prior art belt 42 is typically preformed and later incorporated into a tire. For example, before curing a tire, preformed prior art belt 42 is placed or laid over a standard belt building drum 44. Prior art belt 42 is then bonded to the tire as it is cured.

FIG. 3 depicts the most typical construction of prior art belt 42, which comprises two plies 46. Each ply typically includes a plurality of cords 48 reinforcing a rubber or precured polymeric matrix 50. Many variations on this basic belt structure are disclosed in the prior art. Exemplary variations include the number of plies, the type of cord, cord direction, the type of matrix material, and the like. Prior art belts, however, have not provided a lightweight semi-rigid belt having a high resistance to compression. Lightweight belts reduce fuel consumption by transferring energy to the road more efficiently. While some flexibility is important for a smooth ride, semi-rigid belts reduce the standing wave of the tire thereby reducing internal stress and heat buildup which can limit the useful life of the tire. Rigidity is also important to run-flat capability, puncture resistance, more general handling characteristics, and prolonging tread life.

Figure 4A:
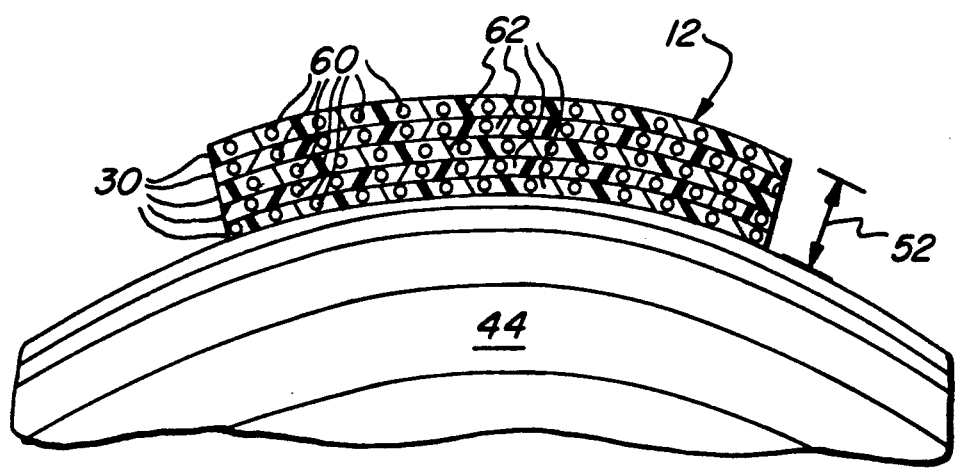
FIG. 4A is a schematic front cross-sectional view of the composite belt shown in FIG. 1.

Referring now to FIG. 4A, a schematic cross-sectional view of a tire construction, composite reinforcing belt 12 is shown. As described above with reference to FIG. 1, composite belt 12 is formed by bonding a plurality of plies 30 together. Composite belts are often slightly curved to match the curvature in the crown portion of a tire important for proper handling and performance characteristics. Each ply 30 is preferably between about 0.025 mm and about 1.27 mm thick, but is most preferably about 0.64 mm thick. The number of plies per belt is preferably between 2 and 8, but is most preferably 4 to 6. Thus, the overall thickness of composite belt 12, as indicated at 52, is generally between about 0.050 mm and about 10.2 mm and preferably between about 2.56 mm to 7.6 mm.

Each ply 30 is formed from a plurality of cords 60 in a matrix of semi-rigid resin 62. Alternatively, plies may be formed from tape made with cords and flexible resin. Cords 60 have a high tenacity of greater than about 12 grams/denier and an extensional modulus of elasticity of between about $10^2$ grams/denier and $10^3$ grams/denier, and are preferably selected from among aramid, steel, fiberglass, carbon, and polyesters. Aside from considerations of cost, cords 60 are most preferably aramid, then carbon, then fiberglass with an extensional modulus of elasticity of between about 200 grams/denier to 800 grams/denier. Further, cords 60 of plies 30 are preferably arranged or placed substantially circumferentially around the tire. However, one or two 45° bias plies may enhance the belts lateral rigidity, thereby resisting delamination and improving overall handling. Semi-rigid resin 62 is thermoplastic, such as nylons or polyphenylene ethers, or thermosetting, such as epoxies or polyesters, but is preferably thermoplastic. The most preferred thermosetting resin is epoxy which is valued for its tensile and hardness qualities. The most preferred thermoplastic resin is polyphenylene ether such as, for example, that sold under the trademark VESTORAN® by Huls Aktiengesellschaft, and especially VESTORAN® 1900 or VESTORAN® 2000.

Figure 4B:
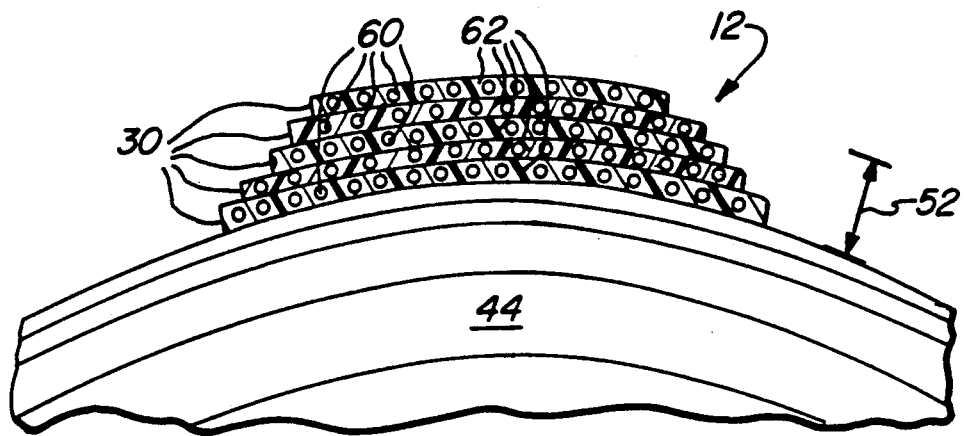
FIG. 4B is a schematic front cross-sectional view of the composite belt of FIG. 4A except that the plies are cut with decreasing width from the carcass toward the tread.

Referring now to FIG. 4B, a schematic cross-sectional view of a tire construction, a variation on composite reinforcing belt 12 of FIG. 4A is shown. In this variation, plies 30 have continuously decreasing axial widths as they extend radially outward from the carcass to the tread of the tire to provide a tapered edge to the belt package.

There are several methods of constructing a tire with this composite reinforcing belt. Thus, the entire belt may be preformed or precured and adhered to the tire during the curing thereof. Alternatively and most preferably, the entire belt may be placed or laid during construction of the tire and cured or formed into final configuration in situ during the curing of the tire in which it is placed. The temperatures necessary to cure a tire range from about 177° to 260° Celsius. Thus, in order for resin 62 to be cured or formed in situ it must have a curing or forming temperature within the range of typical tire curing temperatures.

Figure 5:
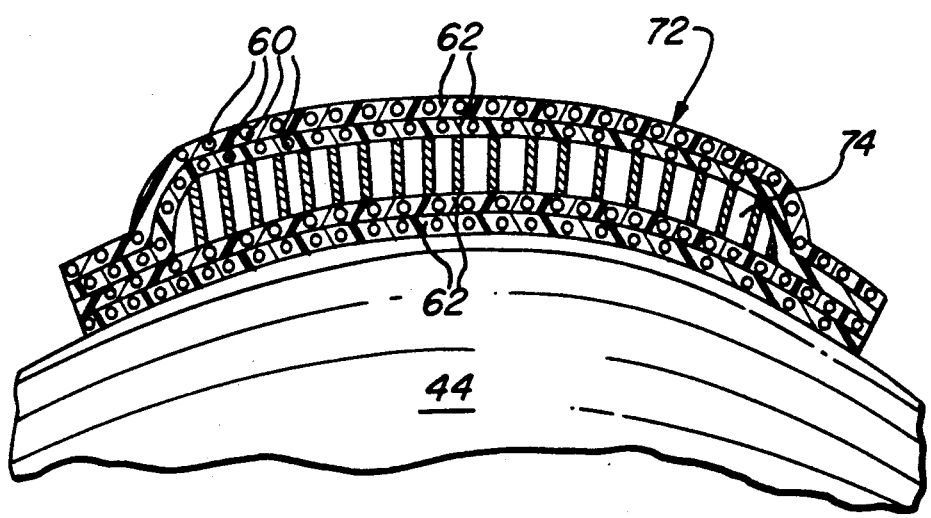
FIG. 5 is a schematic front cross-sectional view of the composite belt of FIG. 4A except that the middle ply is replaced by a structural separator.

Referring now to FIG. 5, a schematic cross-section of a tire construction including a composite reinforcing belt 72 is shown. Composite belt 72 is similar to composite belt 12 except that a ply 30 of composite belt 12 has been replaced with a structural separator 74 having a high resistance to compression of between about 1100 psi and about 1200 psi. Separator 74 ranges between about 1.3 mm and about 3.8 mm in thickness and is preferably about 2.5 mm thick. Separator 74 is preferably selected from among honeycombs, corrugations, and rigid foams, but other materials having a weight lighter than the resin and high resistance to compression are possible. Most preferably, separator 74 is an aramid honeycomb such as, for example, that made from a material sold under the trademark NOMEX® by Dupont De Nemours Inc. Separator 74 is preferably bonded between two plies of composite belt 72, and is most preferably bonded with two or more plies on either side thereof.

A length of composite belt having a NOMEX® honeycomb separator sandwiched with two prepreg aramid plies on either side was tested for shear strength with a ¼ inch anvil over a 2¼ inch spread. The sample repeatedly withstood over 300 pounds. On the basis of a 4.1 inch diameter hoop of the composite belt described in the preceeding test withstanding over 1200 pounds in a deflection test, a tire sized composite belt would hold over 1500 pounds (¼ the weight of an average vehicle) with less than 2 inches of deflection. Such a composite belt is thus semi-rigid in that it will marginally deform under loads below but approaching its breaking strength.

Similar to composite belt 12, composite belt 72 is preferably cured or formed in situ during the curing of the tire in which it is placed. This approach offers a number of advantages over the prior art approach of curing a tire with a preformed or precured belt. First, by curing or forming the belt in situ it is simultaneously bonded to the tire, resulting in increased uniformity and adhesion. Second, by curing or forming individual plies in situ as well, the bonding between plies which form a belt is more uniform. These advantages are heightened by use of the most preferred resin, polyphenylene ether, which bonds firmly to tire rubber compositions without the need for any additional adhesive, minimizing stress between the belt and the tire. A typical such tire rubber composition includes in parts by weight: 100 SBR, 25.0 carbon black, 3.00 aromatic oil, 4.00 zinc oxide, 1.00 stearic acid, 1.50 sulfur, and 1.30 DCBS.

Although the invention has been described with reference to particular embodiments, features, materials of construction and the like, these are not intended to exhaust all possible features, and indeed many other modifications and variations will be ascertainable to those of skill in the art without departing from the scope of the invention as defined in the appended claims.

What is claimed is:

1. A pneumatic tire including:
    a plurality of resin impregnated plies;
    each ply comprising a plurality of cords having a high modulus of elasticity and a high tenacity and formed of a material selected from the group consisting of aramid, steel, fiberglass, carbon and polyester;
    said cords being surrounded by a matrix of resin selected from the group consisting of epoxies, polyesters, nylons and polyphenylene ethers; and
    a honeycomb separator substantially radially centered between said plies; said honeycomb separator being between about 1.3 mm and about 3.8 mm in thickness, having a weight lighter than the resin, and having high resistance to compression;
    said matrix of resin binding said plurality of resin impregnated plies and said honeycomb separator together to form a monolithic reinforcing belt.

2. The pneumatic tire of claim 1 wherein said cords are formed of aramid and wherein said resin is polyphenylene ether.

3. The pneumatic tire of claim 1 wherein said honeycomb separator is formed from aramid.

4. The pneumatic tire of claim 1 including at least three plies.

* * * * *